United States Patent
Otto et al.

(10) Patent No.: US 7,361,868 B2
(45) Date of Patent: Apr. 22, 2008

(54) ELECTRICAL HEATING DEVICE, ESPECIALLY FOR MOTOR VEHICLES

(75) Inventors: Jürgen Otto, Illingen (DE); Michel Brun, Rustenhart (FR); Yannik Laumonnerie, Rouffach (FR); Grégory Lucas, Rouffach (FR); Pascal Miss, Sélestat (FR); Mathieu Mougey, Ensisheim (FR); Christophe Schmittheisler, Epfig (FR)

(73) Assignees: Behr GmbH & Co. KG, Stuttgart (DE); Behr France S.A.R.L., Rouffach (FR)

( * ) Notice: Subject to any disclaimer, the term of this patent is extended or adjusted under 35 U.S.C. 154(b) by 0 days.

(21) Appl. No.: 10/548,734

(22) PCT Filed: Mar. 5, 2004

(86) PCT No.: PCT/EP2004/002296

§ 371 (c)(1),
(2), (4) Date: Jun. 6, 2006

(87) PCT Pub. No.: WO2004/080738

PCT Pub. Date: Sep. 23, 2004

(65) Prior Publication Data

US 2007/0045263 A1    Mar. 1, 2007

(30) Foreign Application Priority Data

Mar. 13, 2003    (EP) .................................. 03005697

(51) Int. Cl.
*H05B 3/34* (2006.01)
(52) U.S. Cl. ...................... 219/528; 219/202; 219/505; 219/530; 219/540; 392/347; 392/355; 392/360; 392/379
(58) Field of Classification Search ................ 219/200, 219/202, 530, 540, 507, 505, 534, 536, 538, 219/539, 528; 392/34.7, 355, 360, 379
See application file for complete search history.

(56) References Cited

U.S. PATENT DOCUMENTS

| 4,425,497 | A | | 1/1984 | Leary et al. | |
|---|---|---|---|---|---|
| 4,761,541 | A | * | 8/1988 | Batliwalla et al. | 219/528 |
| 4,833,305 | A | | 5/1989 | Mashimo et al. | |
| 5,006,696 | A | * | 4/1991 | Uchida et al. | 219/505 |
| 5,206,476 | A | | 4/1993 | Fresch et al. | |

(Continued)

FOREIGN PATENT DOCUMENTS

DE    42 13 510 C1    8/1993

(Continued)

*Primary Examiner*—Sang Y. Paik
*Assistant Examiner*—Leonid Fastovsky
(74) *Attorney, Agent, or Firm*—Foley & Lardner LLP

(57) ABSTRACT

This disclosure relates to an electrical heating device, especially for motor vehicles, including a closed frame (2) which include rails (3, 4) and cross rails (5, 6), heating elements (7) which include elements made of electrically conductive plastic layers (18) having PCT effect, which are arranged between contact plates (15, 16), heat-conducting secondary surface elements (8) that can be overflown by air and at least one electrically conductive spring element (9), wherein the heating elements (7) and the secondary surface elements (8) are alternatingly arranged next to one another and are braced against each other by the rails (3, 4) and a spring element (9) placed centrally which replaces the secondary surface element (8).

14 Claims, 2 Drawing Sheets

U.S. PATENT DOCUMENTS 5,665,261 A * 9/1997 Damsohn et al. ........... 219/504
6,472,645 B1 * 10/2002 Bohlender .................. 219/505

FOREIGN PATENT DOCUMENTS

| DE | 199 11 547 A1 | 9/2000 |
| DE | 199 57 452 A1 | 5/2001 |
| EP | 0 092 406 A2 | 10/1983 |
| EP | 1 130 337 A2 | 9/2001 |

* cited by examiner

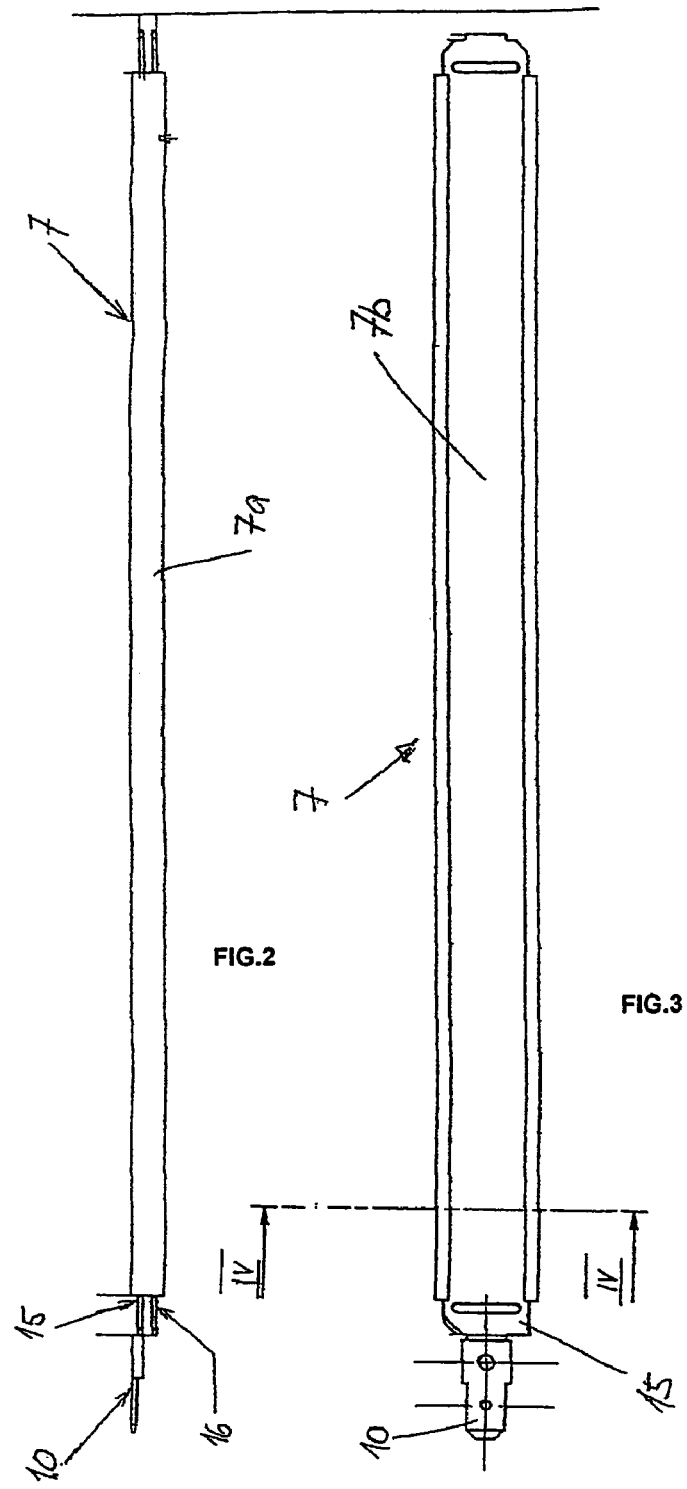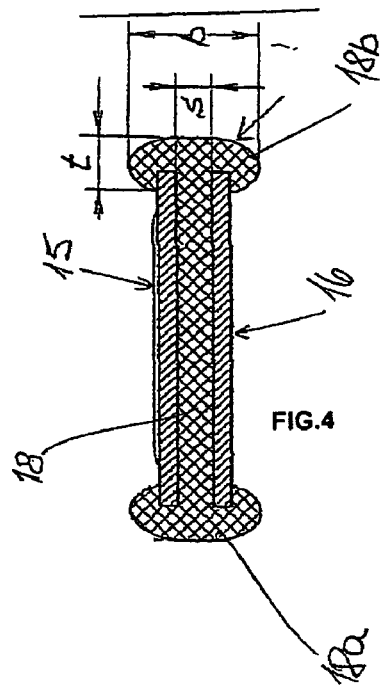
FIG.2
FIG.3
FIG.4

ELECTRICAL HEATING DEVICE, ESPECIALLY FOR MOTOR VEHICLES

The invention relates to an electric heating device, in particular for a motor vehicle according to the subject matter of the relatively old European patent application with the application number 02 292 464.1.

Such heating devices are used as supplementary heaters in motor vehicles with engines with optimized consumption because the heat loss of the engine is not sufficient to heat the passenger compartment owing to the relatively high thermal efficiency. DE-A 199 11 547 and DE-A 199 57 452 have disclosed independent electric supplementary heaters which are installed as supplementary components in a heating system for a motor vehicle, for example downstream of the heating element of the heating system. These supplementary heaters are composed of a heating register or heating block with individual heating elements between which secondary surface elements in the form of corrugated ribs are arranged. Corrugated ribs and heating elements are arranged one next to the other in an alternating fashion in a frame and are in contact with one another in a thermally conductive and electrical fashion. In the center of the heating block, a corrugated rib between two heating elements is replaced by a spring element which causes the heating elements and the corrugated ribs to be clamped to one another and with respect to the frame. The heating elements are composed of two electrodes between which PTC elements made of a ceramic material are arranged. A disadvantage with these ceramic PTC elements is that the material is brittle and fragile as well as relatively expensive. Furthermore, these ceramic PTC elements require special securing or attachment means, for example in the form of an adhesive or sealing profile. This increases the structural complexity and the costs.

U.S. Pat. No. 5,206,476 and DE-C 42 13 510 have disclosed air heating devices in the form of grille-shaped air vents which are manufactured from a plastic material, for example a polymer which is electrically conductive and thus has what is referred to as a PTC effect. The thermal efficiency of these heatable plastic grilles is comparatively low, due, inter alia, to the poor thermal conductivity of the plastic.

An object of the present invention is to improve an electric heating device of the type mentioned at the beginning, in particular with respect to the manufacturing costs and the expenditure in terms of fabrication and the structural complexity.

This object is achieved by means of the features of patent claim 1. According to the invention, the PTC heating elements are composed of an electrically conductive plastic which has a PTC effect and is arranged as a layer between electrodes which are embodied as contact plates. The ceramic PTC elements are thus replaced by a continuous plastic layer, which provides advantages both in terms of price and manufacturing equipment. The plastic with a PTC effect can be introduced between the electrodes or contact faces by means of a relatively simple plastic injection molding method and does not require any additional securing or attachment means. This results in cost-effective heating elements which are assembled, together with secondary surface elements, for example in the form of corrugated ribs, in a frame to form the electric heating device. The necessary tension between the heating elements and corrugated ribs in order to produce the thermally conductive and electrical contact is applied by means of an electrically conductive spring element which is arranged in the central region between two heating elements in place of a corrugated rib. As a result, the heating elements and corrugated ribs can be held in frictionally locking engagement in the frame.

Advantageous refinements of the invention emerge from the subclaims. For example, the plastic with a PTC effect is composed of a PP, PE, EVA or PA with electrically conductive particles, for example what is referred to as conductive carbon black. This plastic can be sprayed so that a heating element which is composed essentially of two contact plates and a plastic layer located between them can be manufactured in one simple fabrication process by encapsulation by injection molding. The longitudinal sides of the contact plates are advantageously also included in the encapsulation by injection molding so that a type of bead is produced in the direction of the longitudinal sides. This bead acts like a mechanical clamp and thus holds the two contact faces or electrodes together. At the ends of the contact plates there are contact terminals by means of which the heating rods are supplied with current by means of a suitable electrical circuit. The layer thickness between two electrodes is decisive for the electrical resistance and thus for the heating effect. In conjunction with the abovementioned plastic materials, a layer thickness of 1 to 2 mm is advantageous for the required heating power within the scope of an on-board vehicle power supply.

An exemplary embodiment of the invention is illustrated in the drawing and will be described in more detail below. In the drawing:

FIG. 2 shows a heating element of the heating block according to FIG. 1 in a side view, FIG. 3 shows the heating element according to FIG. 2 in a plan view, and FIG. 4 shows a section along the line IV-IV in FIG. 3 in an enlarged view.

Figure 1:
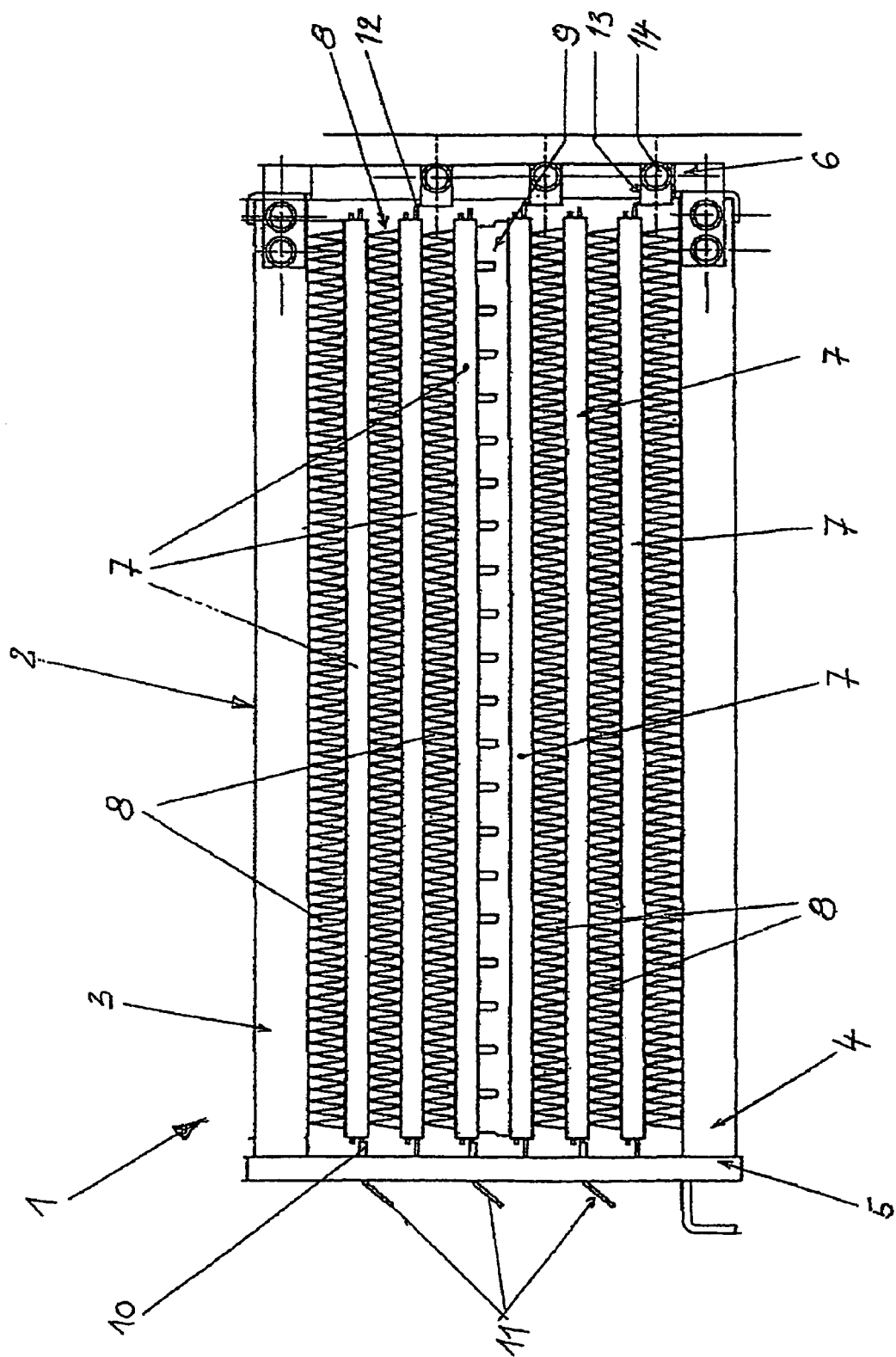
FIG. 1 shows a supplementary electric heater in the form of a heating block.

FIG. 1 shows a supplementary electric heater in the form of a heating block 1 which can be installed in a heating or air-conditioning system for a motor vehicle. This heating block 1 serves to heat air which is fed to the passenger compartment of the vehicle. The heating block 1 is composed of a frame or installation frame 2 which has two longitudinal members 3, 4 and two cross members 5, 6. Rod-shaped heating elements 7 are arranged parallel to the longitudinal members 3, 4 in such a way that they alternate with corrugated ribs 8. In the central region of the heating block 1, a metallic, i.e. electrically conductive, spring element 9 which exerts on the two adjacent heating elements 7 a spring force which is distributed uniformly over their length and is directed toward the longitudinal members 3, 4 is arranged between two heating elements 7. The heating elements 7 and the corrugated ribs 8 which are only in metallic contact with one another are thus clamped to one another so that the pressing force which is necessary for good conduction of heat and good electrical contact is produced. Half of the total of six heating elements 7 whose detailed structure is described below precisely have connecting contacts 10 which are connected to positive plugs 11. The other half of the heating elements 7 have, on the side lying opposite the positive plugs 11, connecting contacts 12 which are connected via a terminal 13 and a sheet-metal screw 14 to the cross member 6 which is embodied as a negative pole, with the cross member 6 being connected to ground in the vehicle.

The electrical connection of the heating elements 7 is carried out in a similar way to that described in the relatively old European application No. 02 292 464.1, i.e. the heating elements 7 are alternately connected to positive and negative so that the current respectively flows from one heating element 7 to the adjacent one via the corrugated ribs 8.

As already mentioned, this heating block 1 may be installed in an air duct (not illustrated) of a heating system so that the air flows through the corrugated ribs 8 and is heated in the process. The corrugated ribs 8 thus conduct away the heat generated in the heating elements 7 to the air and therefore act as secondary surface elements with the purpose of enlarging the heat transmission surface. This ensures effective and rapid heating of the air. The heating block 1 can be mounted at any desired location in the airflow duct (not illustrated) or else mounted directly on a heating element (not illustrated) of the heating system.

FIG. 2 shows a heating element 7 as an individual component in a projection from the side, i.e. with a view of a narrow side 7a. The heating element has two electrodes 15, 16, with one electrode 15 having the connecting contact 10 (cf. FIG. 1). The other electrode 16 has no connecting contact.

FIG. 3 shows the heating element 7 in a plan view, i.e. with a view of a lateral side 7b which is formed by the continuous electrode 15 with the connecting contact 10.

FIG. 4 shows a cross section along the line IV-IV in FIG. 3 through the heating element 7. The cross section of the two electrodes 15, 16 is rectangular, i.e. the two electrodes 15, 16 are manufactured from sheet-metal strips, preferably from an aluminum alloy. A plastic layer 18 with the thickness s=1.4 mm—s corresponding to the distance between the two electrodes 15, 16—is arranged between the two sheet-metal strips 15, 16. The plastic layer 18 continues in the outward direction via the longitudinal edges of the electrodes 15, 16 into two external beads 18a, 18b with the width b and the depth t. The two beads 18a, 18b thus enclose the longitudinal edges of the two electrodes 15, 16 and hold them together like a clamp. The plastic layer 18 in conjunction with the two beads 18a, 18b therefore forms a mechanical connection for the two contact plates 15, 16 which, as well as improving the electrical and thermal conductivity, can have a special structure or roughened portion. Furthermore, it is apparent from this cross-sectional illustration that the heating element 7 is extremely easy to manufacture in terms of injection molding technology by virtue of the fact that the two contact plates 15, 16 are positioned in an injection mold and then are encapsulated with the plastic by injection molding. The external faces of the contact elements 15, 16 remain free so that good thermal and electrical contact with the corrugated ribs 8 (not illustrated here) is produced.

In order to supplement this application, in particular with respect to the plastics which are used for the heating elements 7 and which have a PTC effect as well as their physical properties, reference should be made to the relatively old European application No. 02 292 464.1, which is herewith incorporated in its entirety in this application.

The invention claimed is:

1. An electric heating device for a motor vehicle, comprising:
    a closed frame composed of longitudinal members and cross members,
    a plurality of heating elements arranged in an array within the frame, wherein the heating elements comprise electrically conductive plastic layers which are arranged between contact plates and have a PTC effect,
    a plurality of heat-conducting secondary surface elements over which air can flow, and
    at least one electrically conductive spring element,
    wherein the heating elements and the secondary surface elements are arranged one next to the other in an alternating fashion and are clamped to one another by the longitudinal members and wherein the spring element is arranged in place of one of said secondary surface elements at a position in the central region of the array, and
    wherein at least one of the heating elements comprises an electrically conductive plastic layer which has been injection molded between a first contact plate and a second contact plate such that a width of the electrically conductive plastic layer extends beyond a width of the first and second contact plates to form a bead which partially encapsulates end regions of the first and second contact plates, thereby clamping the first and second contact plates together.

2. The heating device as claimed in claim 1, wherein the heating elements comprise heating rods, and the contact plates comprise sheet-metal strips which are arranged in parallel with one another.

3. The heating device as claimed in claim 1, wherein the secondary surface elements comprise corrugated ribs which have a metallic connection to the contact plates.

4. The heating device as claimed in claim 1, wherein the spring element comprises a metal spring which is permeable to air.

5. The heating device as claimed in claim 2, wherein the contact plate comprises either a positive electrode with a positive connecting contact or a negative electrode with a negative connecting contact, and wherein the positive connecting contacts are connected to positive plugs, and the negative connecting contacts are connected to a negative rail.

6. The heating device as claimed in claim 5, wherein the positive plugs are arranged on the cross member and the negative rail is formed by the cross member.

7. The heating device as claimed in claim 1, wherein the plastic comprises a plastic which comprises conductive particles and comprises at least one plastic selected from the group consisting of PP, PE, EVA, and PA.

8. The heating device as claimed in claim 1, wherein the plastic between the contact plates has a thickness in the range from 1 to 2 mm.

9. The heating device as claimed in claim 1, wherein the heating elements have narrow sides, and wherein the contact plates are encapsulated by plastic in the region of the narrow sides in such a way that beads which form a mechanical connection between the contact plates are formed on both sides.

10. The heating device as claimed in claim 7, wherein the conductive particles comprise conductive carbon black.

11. A motor vehicle comprising a heating device according to claim 1.

12. The heating device according to claim 1, wherein the bead extends along substantially the entire length of the first and second contact plates.

13. The heating device according to claim 1, wherein a second bead formed by the electrically conductive plastic layer partially encapsulates second end regions of the first and second contact plates.

14. The heating device according to claim 13, wherein the second bead extends along substantially the entire length of the first and second contact plates.

* * * * *